(12) United States Patent
Sørensen et al.

(10) Patent No.: US 8,483,530 B2
(45) Date of Patent: Jul. 9, 2013

(54) HOUSING FOR WET-MATEABLE CONNECTOR AND PENETRATOR ASSEMBLY

(75) Inventors: Per Hassel Sørensen, Sandnes (NO); Ivar Breen, Stavanger (NO)

(73) Assignee: Roxar Flow Measurement AS, Bergen (NO)

( * ) Notice: Subject to any disclaimer, the term of this patent is extended or adjusted under 35 U.S.C. 154(b) by 41 days.

(21) Appl. No.: 13/058,929

(22) PCT Filed: Aug. 11, 2009

(86) PCT No.: PCT/NO2009/000280
§ 371 (c)(1),
(2), (4) Date: Feb. 14, 2011

(87) PCT Pub. No.: WO2010/019046
PCT Pub. Date: Feb. 18, 2010

(65) Prior Publication Data
US 2011/0150394 A1  Jun. 23, 2011

(30) Foreign Application Priority Data
Aug. 14, 2008  (NO) .................................. 20083536

(51) Int. Cl.
*G02F 1/295* (2006.01)
(52) U.S. Cl.
USPC .......................................... 385/111; 439/587
(58) Field of Classification Search
USPC ................. 385/53, 56, 94, 111; 439/587–589
See application file for complete search history.

(56) References Cited

U.S. PATENT DOCUMENTS

| | | | |
|---|---|---|---|
| 3,044,805 A * | 7/1962 | McDonald | 285/45 |
| 3,963,297 A | 6/1976 | Panek et al. | |
| 3,967,356 A * | 7/1976 | Holt | 29/701 |
| 4,003,620 A | 1/1977 | O'Brien et al. | |
| 4,039,242 A | 8/1977 | Wilson et al. | |

(Continued)

FOREIGN PATENT DOCUMENTS

| | | |
|---|---|---|
| AU | 706 483 | 6/1999 |
| EP | 0 289 014 | 11/1998 |

(Continued)

OTHER PUBLICATIONS

International Search Report for PCT/NO2009/000280, mailed Nov. 30, 2009.

(Continued)

*Primary Examiner* — Charlie Peng
*Assistant Examiner* — Peter Radkowski
(74) *Attorney, Agent, or Firm* — Nixon & Vanderhye P.C.

(57) ABSTRACT

Electrical and/or optical connector housing (11) with a wet-mateable connector receiving part (17), adapted to receive a mating electrical and/or optical connector counterpart when surrounded by a hydrostatic pressure, such as the pressure of surrounding water. The connector housing (11) exhibits a compartment (19) that is pressure balanced with respect to said hydrostatic pressure, wherein one or more electrical and/or optical conductors (21) are guided from the receiving part (17) to a penetrator (15), said penetrator (15) constituting a pressure barrier between said compartment (19) and an opposite end of the penetrator (15). The housing (11) comprises at least one wall part (29) adapted to be flexed by an exterior hydrostatic pressure exerting force on the housing (11), thereby changing the volume of said inner compartment (19), whereby said wall part (29) constitutes at least a part of the encapsulation of said compartment (19).

15 Claims, 6 Drawing Sheets

U.S. PATENT DOCUMENTS

| | | | |
|---|---|---|---|
| 4,174,875 A | 11/1979 | Wilson et al. | |
| 4,468,858 A * | 9/1984 | Gulberg et al. | 29/764 |
| 4,795,359 A | 1/1989 | Alcock et al. | |
| 4,797,117 A | 1/1989 | Ayers | |
| 4,854,886 A | 8/1989 | Neuroth | |
| 4,960,391 A | 10/1990 | Beinhaur et al. | |
| 5,194,012 A | 3/1993 | Cairns | |
| 5,387,119 A | 2/1995 | Wood | |
| 5,772,457 A | 6/1998 | Cairns | |
| 5,899,765 A | 5/1999 | Niekrasz et al. | |
| 5,940,553 A * | 8/1999 | Murakami et al. | 385/22 |
| 5,964,062 A * | 10/1999 | Jinma et al. | 49/479.1 |
| 6,017,227 A | 1/2000 | Cairns et al. | |
| 6,095,838 A | 8/2000 | Brickett | |
| 6,315,461 B1 * | 11/2001 | Cairns | 385/56 |
| 6,332,787 B1 | 12/2001 | Barlow et al. | |
| 6,402,539 B1 | 6/2002 | Toth et al. | |
| 6,464,405 B2 | 10/2002 | Cairns et al. | |
| 6,475,008 B1 | 11/2002 | Marolda et al. | |
| 6,511,335 B1 | 1/2003 | Rayssiguier et al. | |
| 6,716,063 B1 | 4/2004 | Bryant et al. | |
| 6,736,545 B2 * | 5/2004 | Cairns et al. | 385/56 |
| 6,796,821 B2 | 9/2004 | Cairns et al. | |
| 6,832,924 B2 | 12/2004 | Maletzki et al. | |
| 7,074,064 B2 | 7/2006 | Wallace | |
| 7,080,996 B2 | 7/2006 | Østergaard | |
| 7,112,080 B2 | 9/2006 | Nicholson | |
| 7,225,876 B2 | 6/2007 | Laureano | |
| 2002/0003931 A1 | 1/2002 | Cairns et al. | |
| 2003/0007738 A1 | 1/2003 | Cairns et al. | |
| 2007/0260227 A1 * | 11/2007 | Phan | 606/1 |
| 2008/0153333 A1 | 6/2008 | Dubranna | |

FOREIGN PATENT DOCUMENTS

| | | |
|---|---|---|
| EP | 0 902 505 | 3/1999 |
| FR | 2 537 793 | 6/1984 |
| FR | 2 576 718 | 8/1986 |
| GB | 2 037 498 | 7/1980 |
| JP | 3098057 B2 * | 10/2000 |
| WO | WO 2008/004079 | 1/2008 |
| WO | WO 2008/004084 | 1/2008 |

OTHER PUBLICATIONS

Norwegian Search Report for Norway Application No. 2008 3536, dated Feb. 6, 2009.

* cited by examiner

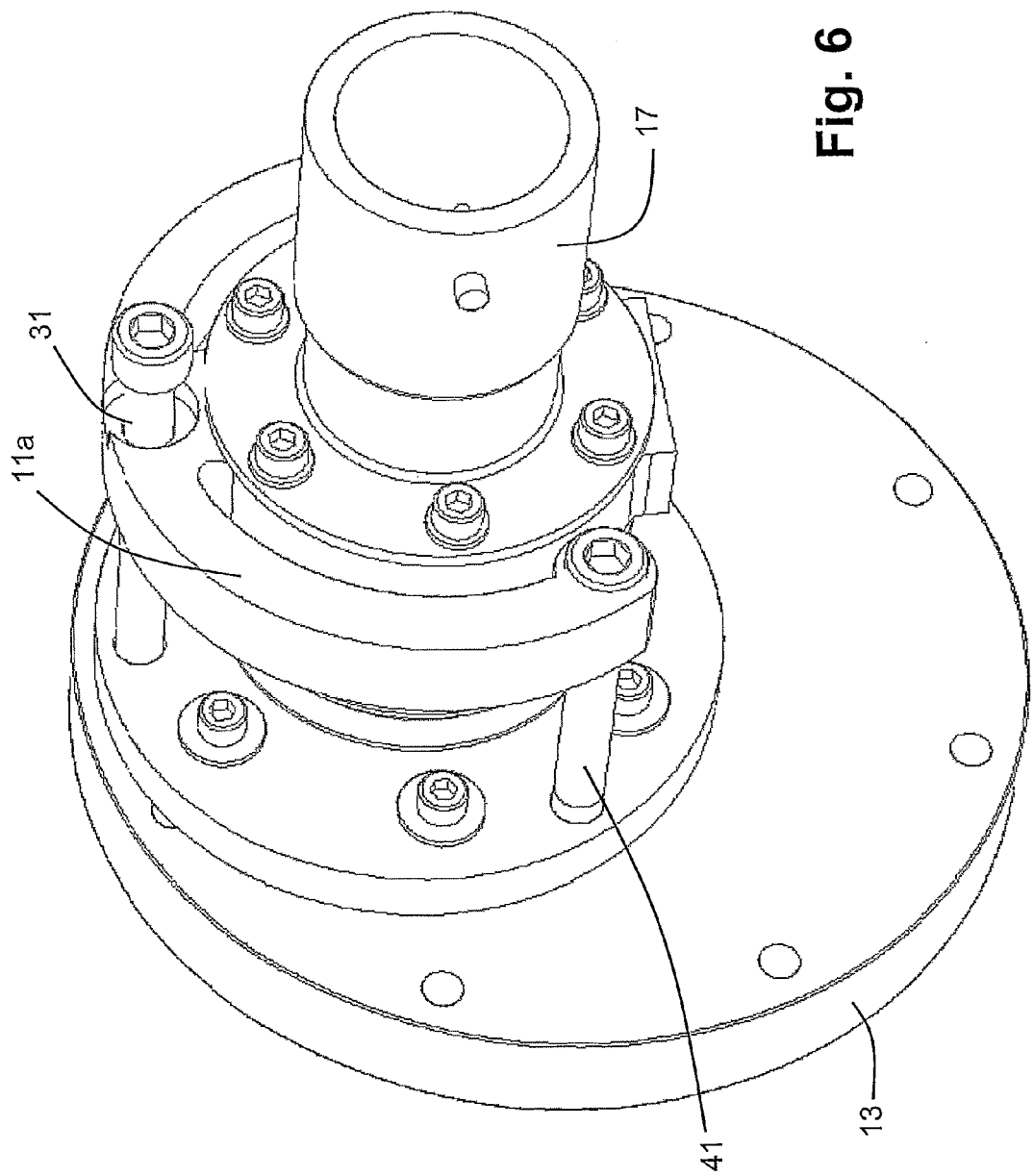

HOUSING FOR WET-MATEABLE CONNECTOR AND PENETRATOR ASSEMBLY

This application is the U.S. national phase of International Application No. PCT/NO2009/000280 filed 11 Aug. 2009 which designated the U.S. and claims priority to Norway Application No. 2008 3536 filed 14 Aug. 2008, the entire contents of each of which are hereby incorporated by reference.

The present invention relates to housings for wet-mate connectors adapted for electrical and/or optical connections in a body of liquid. More particularly, the invention relates to a pressure balanced connector housing for use at high hydrostatic pressures.

BACKGROUND

In various operations taking place under the water surface, especially in connection with oil or gas wells, one needs to provide electrical and/or optical connection to various equipment. Such equipment can for instance be a flow meter for monitoring the flow of hydrocarbons in a pipe, a temperature gauge, a pressure gauge, etc. Such connections may also be needed on order to actively control equipment such as valves, or control devices such as microcontrollers.

For such under water connections, specially adapted connectors are known. For instance, patent publication U.S. Pat. No. 5,772,457 describes a submersible electrical connector system. Here, electrical conductors extend in an inner chamber of the housing. The chamber is filled with a dielectric fluid. By arranging a bladder which constitutes a part of the chamber periphery, the chamber is pressure balanced with respect to the external hydrostatic pressure.

French patent application FR 2576718 describes another setup for achieving such pressure compensation. This publication describes a plug connection for interconnection to cables. Here, each facing plug part (11, 10) exhibit an inner chamber filled with a dielectric fluid (131, 132). The chambers are partly surrounded by elastic membranes (161, 162) that will transmit any hydrostatic surrounding pressure to said chambers. Such a setup will reduce the tendency of ambient water to penetrate into the plug parts.

In conditions where electrical conductors are led through a high pressure barrier, conventional elastic seals are not appropriate for withstanding the pressure difference for 20 or 30 years, which is normal design lifetime for permanent subsea installations. In such cases, a penetrator is commonly used. The penetrator can comprise glass that surrounds electrical conductors that extend from one end of it to the other. Since the penetrator shall withstand a large pressure difference and since it is made of glass, which is rather brittle compared to metal, the penetrator cannot tolerate much mechanical stress from the conductors. Such mechanical stress must therefore be accounted for with other means.

FIG. 1 shows such a means. This is an electrical wet-mateable connector housing available from the applicant (Roxar AS) and constituting a relevant prior art with to respect to the present invention. The housing comprises a penetrator adapted for constituting a high pressure barrier. On the right hand side of the penetrator, electrical conductors extend into an internal housing compartment. In use, the appropriate conductors are connected to additional electrical conductors extending towards the right and to a part of the housing that is adapted for receiving a wet-mateable counterpart of the connector. The details of this will be explained in further detail with reference to the other drawings. In the said inner compartment of the housing, there is arranged an electrically isolating liquid, such as an oil. To avoid water (or other external fluid) to penetrate into the inner compartment, the compartment is pressure compensated (pressure balanced) with respect to the outer hydrostatic pressure. In the top part of the housing shown in FIG. 1, there is arranged a piston which freely can adapt an equilibrium position where the pressure of the inner compartment equals the external hydrostatic pressure. Thus in this solution, the penetrator is not mechanically challenged, as the mechanical stress is absorbed by the receiving part of the housing. Moreover, water will not penetrate into the inner compartment.

The known solution illustrated in FIG. 1 has proven to function well. However, with the present invention there is suggested a less complex, lighter and more reliable manner for the desired pressure compensation and absorbance of any mechanical stress. Moreover, the present invention also provides advantages with regard to galvanic corrosion, as will be explained further below.

THE INVENTION

Various advantages of the present invention, compared with the known solution shown in FIG. 1 and other prior art solutions, will be apparent by the following description of its main features.

The present invention provides an electrical and/or optical connector housing with a wet-mateable connector receiving part, adapted to receive a mating electrical and/or optical connector counterpart when surrounded by a hydrostatic pressure, such as the pressure of surrounding water. The connector housing exhibits a compartment that is pressure balanced with respect to said hydrostatic pressure, wherein one or more electrical and/or optical conductors are guided from the receiving part of the housing to a penetrator, said penetrator constituting a pressure barrier between said compartment and an opposite end of the penetrator. The housing comprises at least one wall part adapted to be flexed by an exterior hydrostatic pressure exerting force on the housing, thereby changing the volume of said inner compartment, whereby said wall part constitutes at least a part of the encapsulation of said compartment.

With such a connector housing, pressure balancing of the inner compartment is provided without any additional devices or venting holes.

The housing according to the invention is preferably adapted to be compressible in a substantially linear direction, as the housing walls comprise one or more folds which extend substantially orthogonal to said linear direction. This gives a reliable and robust structure of the housing. The fold(s) extend preferably circumferentially about said compartment.

In an advantageously embodiment of the present invention, the housing is arranged with a support structure for maintaining the substantial orientation of the receiving part, the interface between said support structure and housing allowing said wall part to flex. This provides the housing with the possibility of adsorbing additional mechanical forces.

Preferably, the support structure is a cylinder in which the housing is arranged. The support structure can alternatively comprise a support bolt along which axis a part of the housing can slide, the support bolt having a sliding interface with the housing.

In an embodiment resulting an additional advantages, as will be further described below, the housing walls are manufactured of an electrically non-conducting material, such as hard plastic.

Said inner compartment can advantageously be filled with a dielectric liquid, such as an oil. Also, the said wall part is preferably biased with a biasing means to provide an overpressure in the compartment, in order to prevent penetration of fluid into the compartment.

In a particularly preferred embodiment, the biasing means comprises a torsion spring extending out from a part of the housing, whereby the torsion spring exerts a biasing force onto the housing, as it at a distance from the rest of the housing is connected to an anchorage point.

The housing can comprise a cable protector in the compartment through which said electrical and/or optical conductors extend. The cable protector prevents the conductors from being damaged by movement of a flexible wall part.

The cable protector preferably exhibits an outer surface in a proximity to the inner wall surface of the housing to support the housing wall in a situation of an excessive pressure drop across the housing wall to prevent a collapse of the housing.

Preferably, the cable protector exhibits an inner contact edge arranged to maintain a penetrator contact correctly connected to the penetrator conductors, as it is adapted to abut against said penetrator contact.

Having explained the main features and preferable variations of the present invention, further advantages of the invention will be appreciated by a person skilled in the art from the following description.

EXAMPLE

In the following, a detailed description of an example embodiment of the present invention will be given. In addition, a short description of a prior art solution is given to illustrate the advantageous features of the invention. The descriptions are given with reference to the drawings, in which FIG. 1 is a cross section perspective view of a pressure balanced connector housing according to prior art;

FIG. 6 is a perspective view of a special embodiment of the housing according to the invention.

Figure 1:
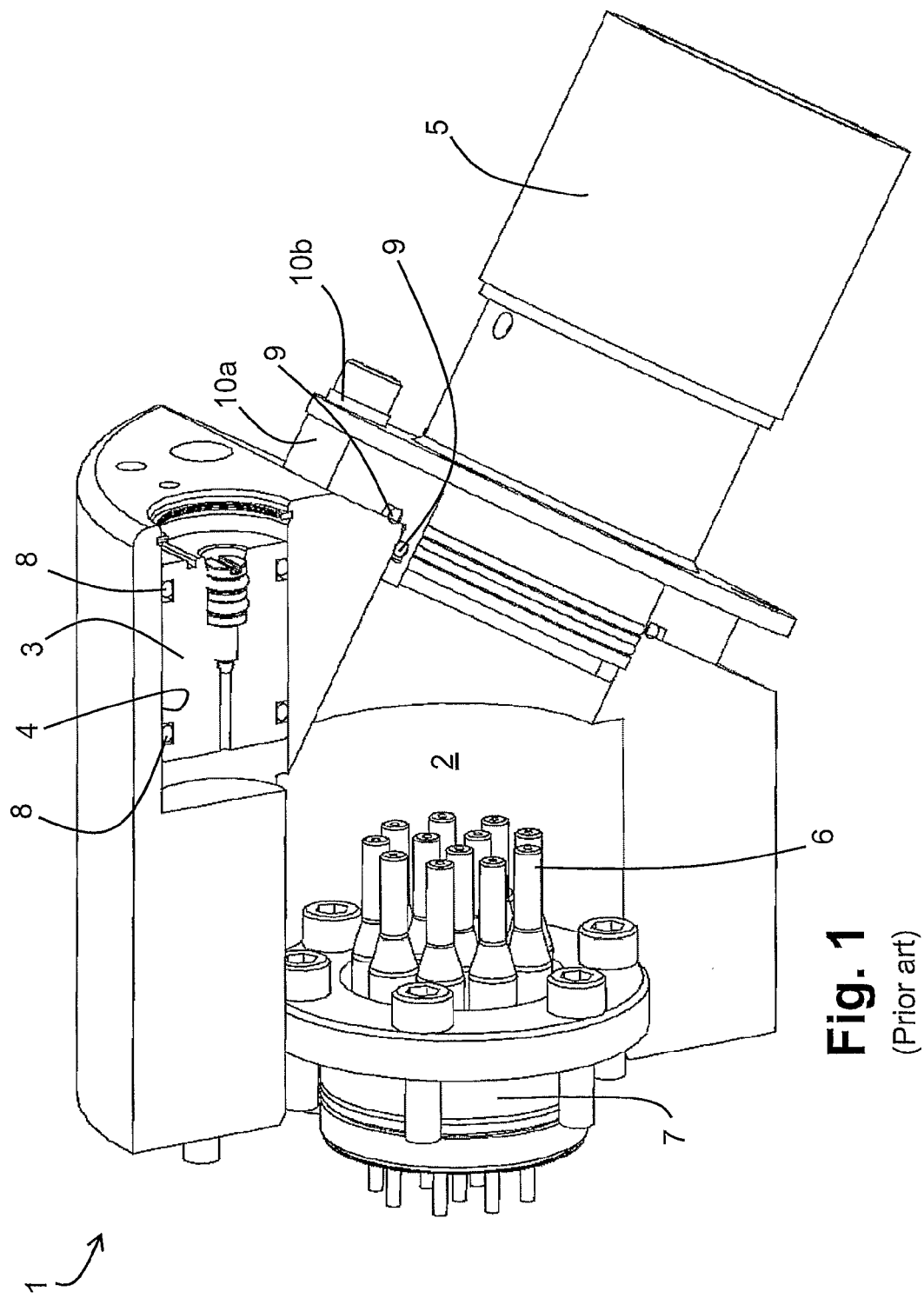

In FIG. 1 a wet-mate connector housing 1 according to prior art is shown, adapted for use in an underwater environment with high hydrostatic pressure. The connector housing 1 exhibits an inner compartment 2. The inner compartment 2 is pressure balanced by means of a movable piston 3 arranged in a bore 4 in the wall of the housing 1. The bore 4 is in fluid connection with the compartment 2. When a hydrostatic pressure is present outside the connector housing 1, the piston 3 will thus move in the bore 4 and thereby ensure pressure balancing of the inner compartment 2. The inner compartment 2 is advantageously filled with an electrically isolating liquid, such as an oil. Thus, a change in the exterior hydrostatic pressure will not result in a large movement of the piston 3, since the liquid in the compartment 2 is not very compressible.

Connected to the right end of the housing 1 is a receiving part 5 of a wet-mateable electrical connector. The opposite part of the connector is not shown. The receiving part comprises electrical conductors (not shown) adapted to connect to conductors in the opposite connector part (not shown). As not shown in FIG. 1, however in FIGS. 3 and 4, from said conductors in the receiving connector part the conductors are extended to protruding conductors 6 of a high pressure penetrator 7.

To keep the liquid in the inner compartment 2 separated from the surrounding high-pressurized water, the piston 3 is provided with two ring seals 8. In addition the receiving part 5 is provided with two ring seals 9 abutting against the connector housing 1.

Often the outer shell of such a wet mate connector 5 must be galvanic insulated from the housing 1 to avoid intermetallic corrosion. Intermetallic corrosion is caused by the use of different metals for connector and housing having different electropotential when the assembly is submerged in sea water. Thus it is normal to electrically insulate the connector shell of the wet mate connector 5 from the housing 1 by dielectric spacers 10a and dielectric washers 10b, normally made of high strength polymers like PEEK or POM.

Figure 2:
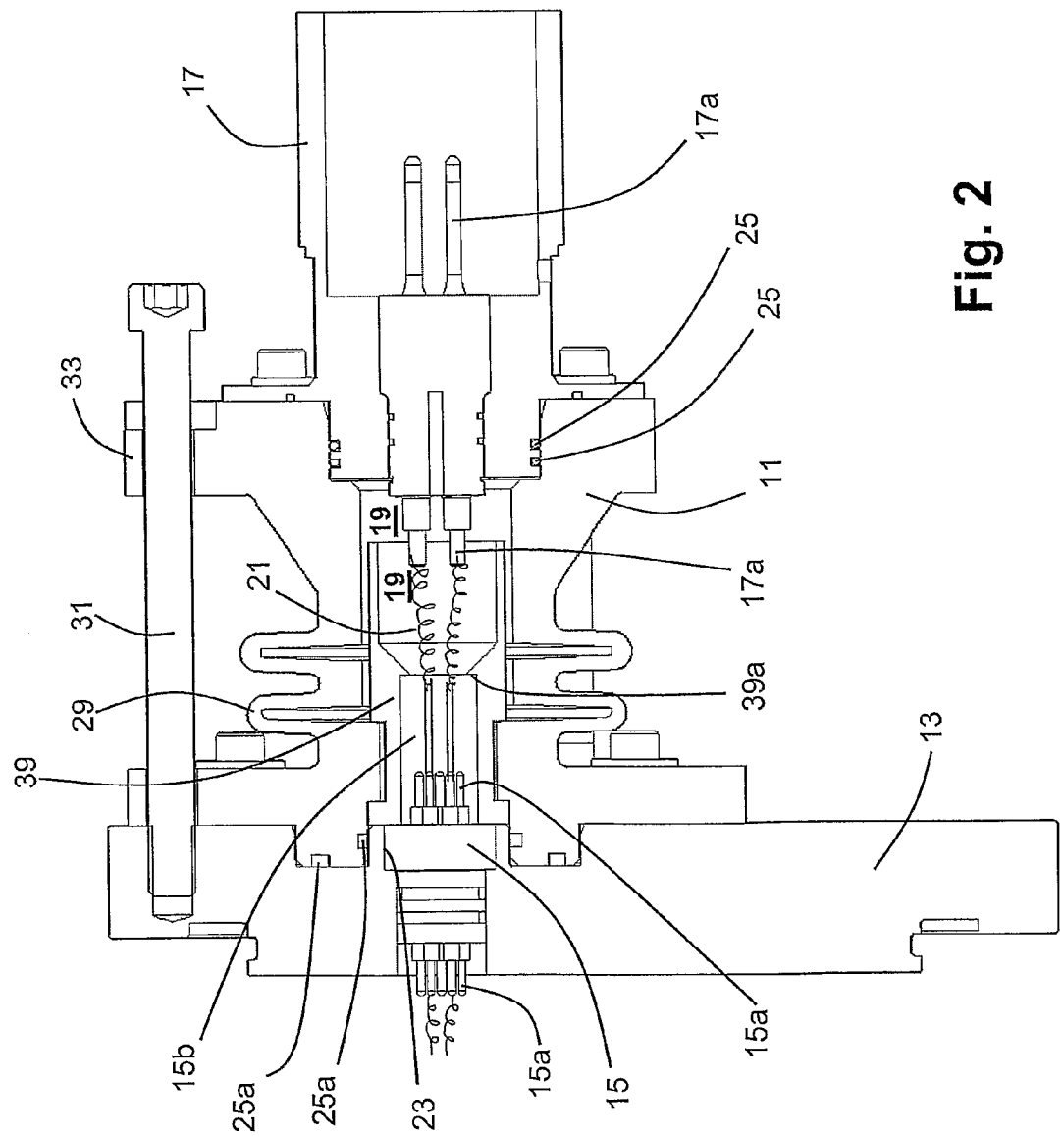
FIG. 2 is a cross section view of a connector housing according to the invention, illustrating electrical conductors being guided from the receiving part of a wet-mateable connector to the inside of an equipment-containing vessel.

FIG. 2 shows an embodiment of a connector housing 11 according to the present invention. On its left hand side, the housing 11 is connected to a wall part 13 of a container with electrical equipment (not shown). In the wall part 13 is arranged a high pressure penetrator 15. The penetrator 15 guides electrical conductors 15a through the wall part 13 and constitutes a pressure barrier.

On the right hand side of FIG. 2, the housing is attached to a receiving part 17 of a wet-mateable electrical connector. The receiving part 17 is adapted to connect to a counterpart of a wet-mateable connector assembly (the counterpart is not shown). It guides electrical conductors 17a through the receiving part 17, into an inner compartment 19.

Thus, from the receiving part 17 and the penetrator 15, electrical conductors 17a, 15a, are respectively guided into the inner compartment 19. In the inner compartment 19 the conductors 15a, 17a are appropriately connected by additional flexible conductors 21. Accordingly, electrical connections are provided between the right hand side of the receiving part 17 and the left hand side of the penetrator 15.

The penetrator 15, which constitutes a high pressure barrier, is sealed to the wall part 13 with an electron beam weld sealing two facing surfaces of the wall part 13 and the penetrator 15 at welding point 23. The receiving part 17 of the wet-mateable connector is sealed to the walls of the housing 11 with two elastomer o-ring seals 25. The housing 11 is sealed to the wall part 13 with similar double elastomer o-ring seals 25a located close to the penetrator 15.

In theory, the penetrator 15 and the receiving part 17 could be made as one device attached directly to the wall part 13 (i.e. omitting the housing 11 and additional receiving part 17). However, since the penetrator 15 advantageously comprises brittle glass and must withstand a large pressure difference, it is not suited for absorbing large mechanical strain. Such strain can arise from an electrical cable attached to the receiving part 17. Hence, the penetrator 15 is adapted to absorb the pressure difference and the housing 11 is arranged to absorb the mechanical forces on the receiving part 17. The electrical and/or optical conductors 21 from the receiving part to the penetrator are preferably loose, flexible wires that will not exert any mechanical force onto the penetrator 15.

Another advantage with this split setup of the penetrator 15 and the receiving connector part 17 is the feasibility of changing the type of receiving part 17. Since various suppliers of such wet-mateable electrical contacts and thus many different types of connectors exist, such a feature is advantageous since the pressure barrier quality and reliability becomes independent of the large variety of possible connectors, reducing the time and cost involved in qualifying the pressure barrier. Also, in case of damage to the connector, replacing only the connector will be more efficient than replacing the penetrator, which requires much more work to be done.

The o-ring seals 25 between the receiving part 17 and the housing 11 and the similar seals 25a between wall part 13 and housing 11 can withstand a certain amount of pressure difference. However, the pressure range experienced in some deepwater locations, such as in connection with a subsea well, can be too much, especially when exposed to high pressure differential for many years. Therefore the housing 11 is provided with an inner compartment 19 which is pressure balanced with respect to the exterior hydrostatic pressure, as explained with reference to FIG. 1 (prior art). As with the prior art example (FIG. 1), the inner compartment 19 is advantageously filled with a liquid, preferably a silicone oil or other suitable dielectric liquid.

To provide for the pressure balancing of the inner compartment 19, the walls of the connector housing 11 are provided with two folds 29. When a hydrostatic pressure is present on the outside of the housing 11, it will force the housing folds 29 to fold, thereby reducing the space of the inner compartment 19. This space reduction will increase the pressure in the inner compartment 19 as the oil is compressed. Hence, the pressure in the inner compartment 19 is balanced with respect to the external hydrostatic pressure. Since the compartment 19 is filled with a liquid, being fairly incompressible (at least compared to a gas), the housing folds 29 do not have to fold much before the pressure is balanced. Thus, the housing 11 can be fairly stiff without reducing its desired capability of pressure balancing. In fact, it can be made stiff enough to absorb the mechanical strain exerted on the receiving part 17.

However, if desired, the housing 11 can be provided with support members. For instance, as shown in FIG. 2, it can be provided with bolts 31. In FIG. 2, only one bolt 31 is shown, however a plurality of bolts 31 are preferably arranged. In this embodiment, the bolts 31 are attached to the wall part 13 and run freely through holes in a flange 33 of the connector housing 11. In this way, the radial position of the housing 11 is secured with the bolts 31, yet letting the housing be compressed in an axial direction parallel to the bolts 31 when exposed to forces from the hydrostatic pressure.

Figure 3:
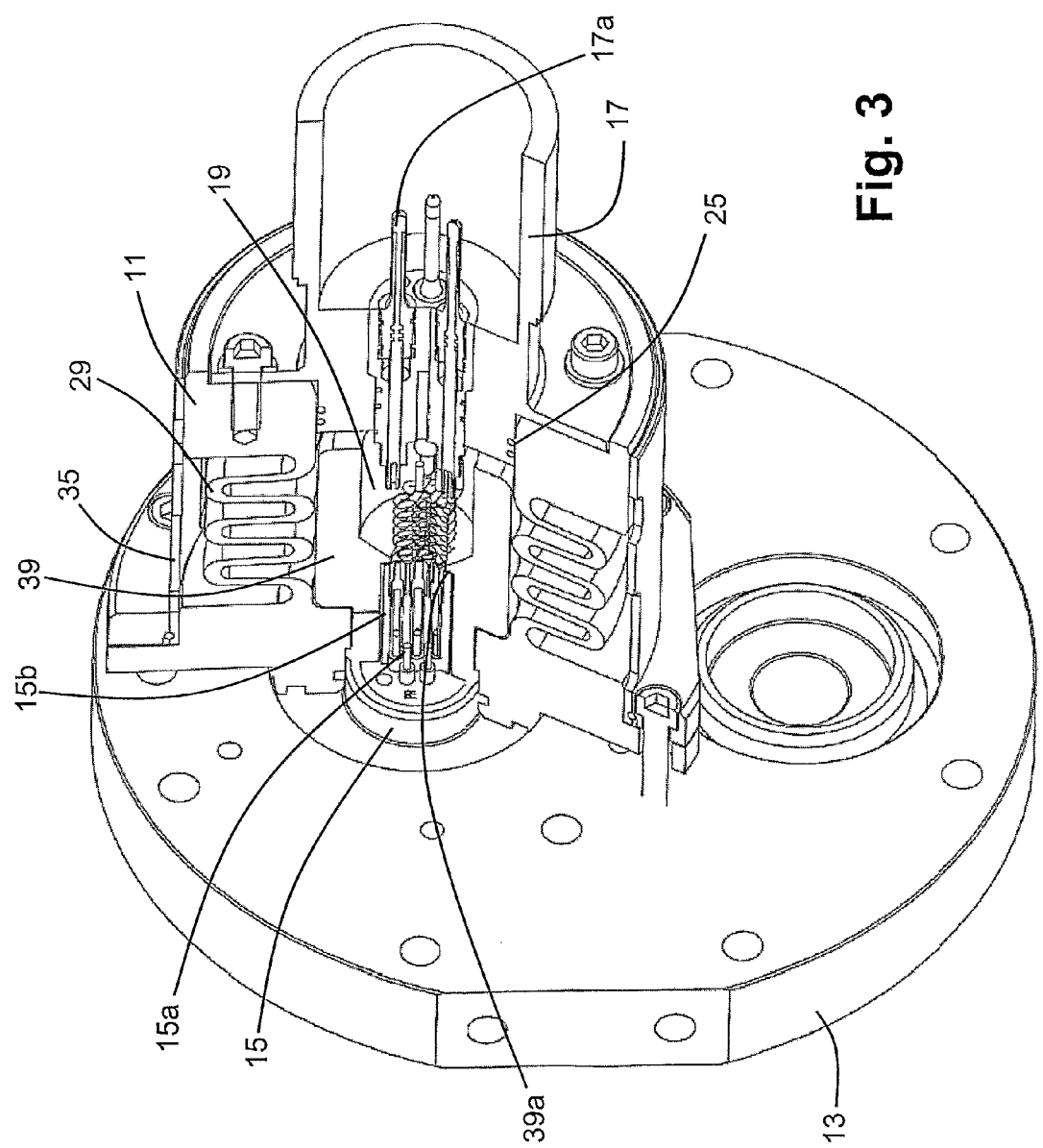
FIG. 3 is a perspective cross section view of a connector housing according to the invention, attached to a wall part of the equipment-containing vessel.

FIG. 3 shows an embodiment of the present invention which is very similar to the embodiment of FIG. 2. In the embodiment of FIG. 3, the housing 11 is provided with three folds 29. In addition, both radially inner and outer parts of the folds 29 are adapted to be folded, thereby making the housing folds 29 more flexible. With the perspective view of FIG. 3, the circular shaping of the housing 11 is illustrated. As easily appreciated, the housing 11 will collapse in an axial direction, parallel to the centre axis of the cylindrical shape of the housing 11 when the folds 29 are folded.

FIG. 3 also shows an alternative way of supporting the housing 11 in the radial direction. Instead of bolts 31 as shown in FIG. 2, the housing 11 is arranged is inside a metal cylinder 35 which is fastened to the wall part 13 together with the housing 11. An advantage of the metal cylinder 35 is that it will protect the walls of the housing 11 from mechanical damage, such as from direct impacts. In addition it will to some extent protect the housing 11 from direct sunlight, which in some cases can affect the housing material if stored onshore without other covering.

Figure 4:
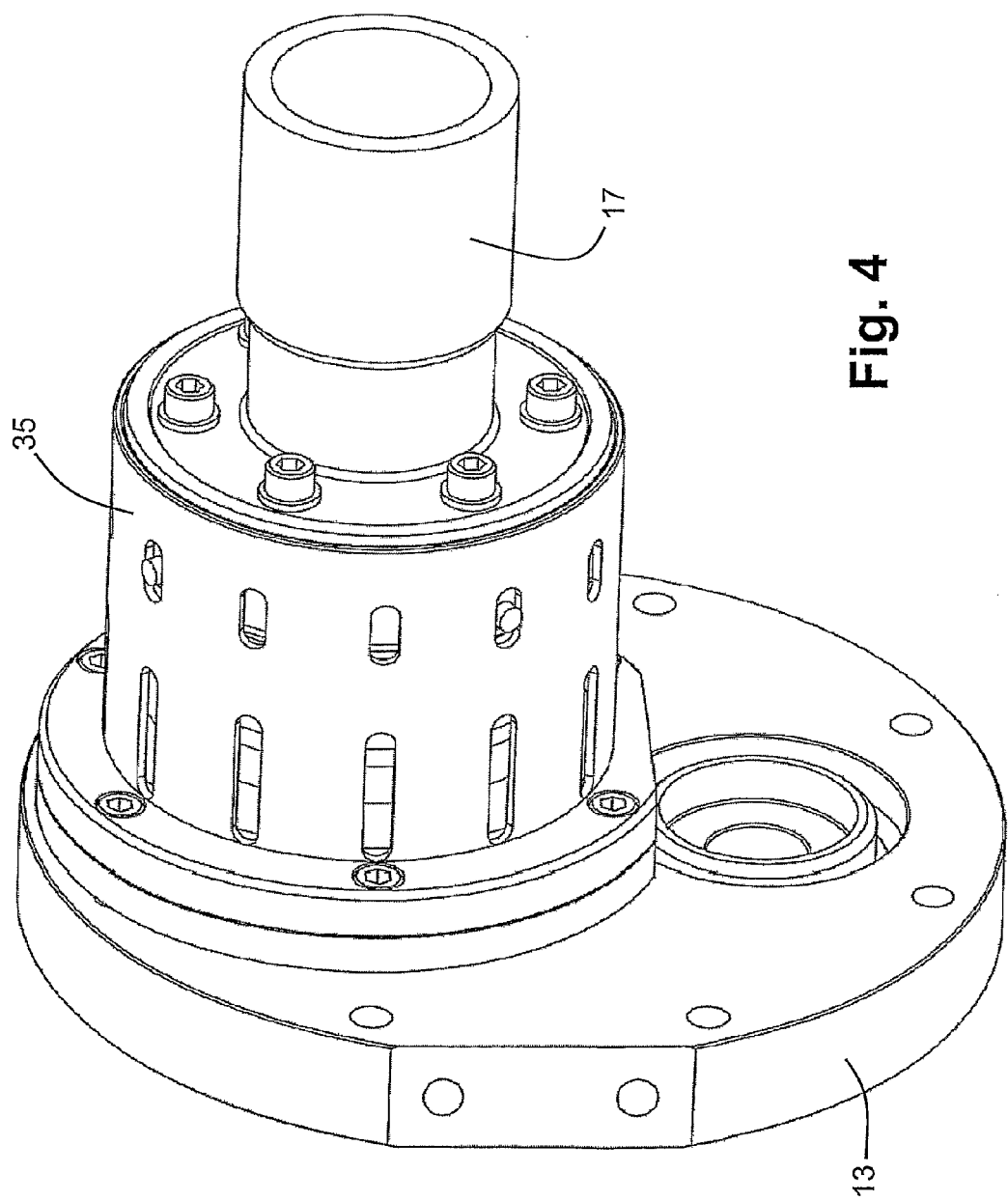
FIG. 4 is a cross section perspective view of the assembly in FIG. 3.

In FIG. 4, the connector housing 11 in FIG. 3 is shown in a perspective view embraced by the cylinder 35.

Figure 5:
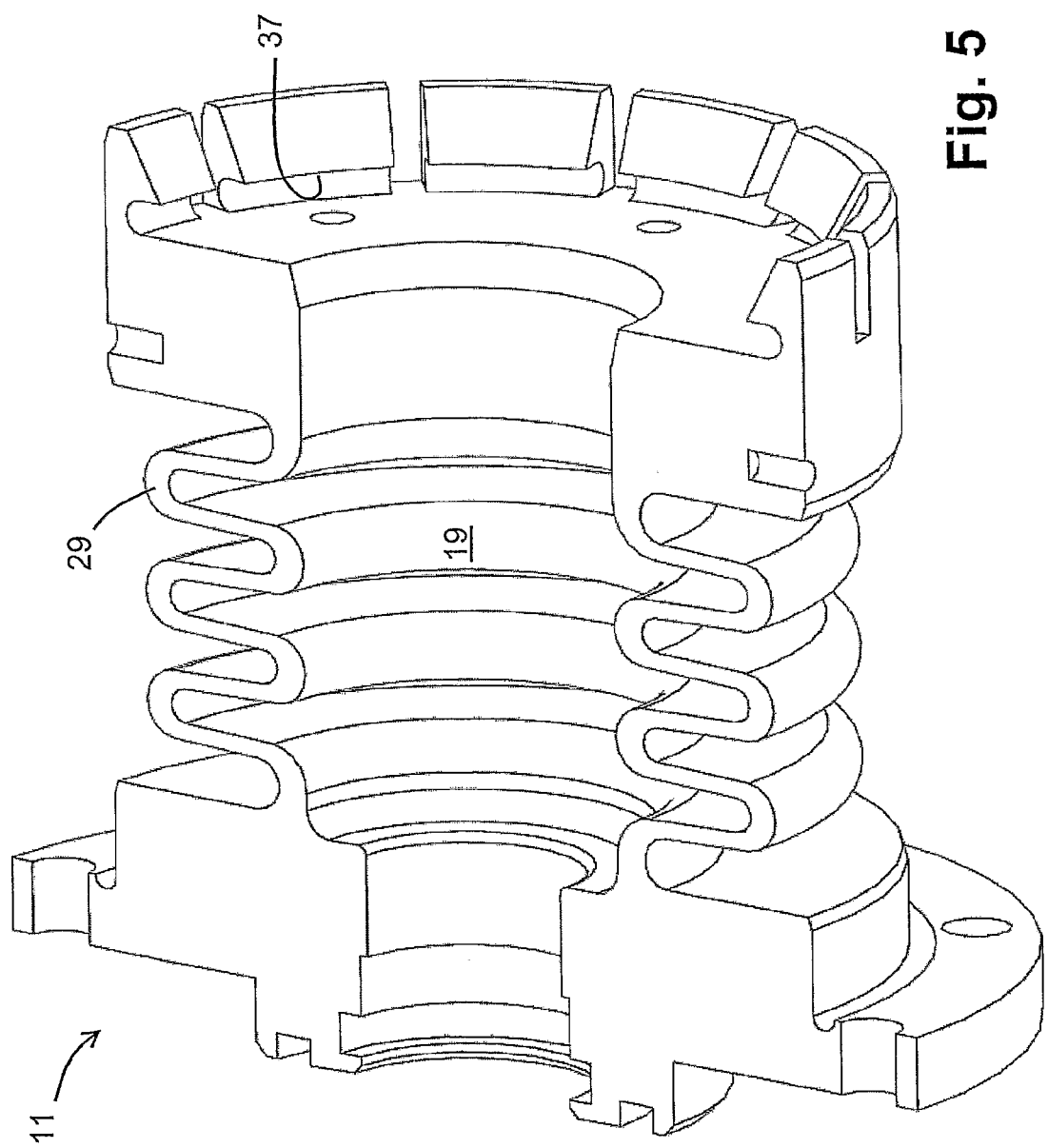
FIG. 5 is a cross section perspective view illustrating the housing walls of the housing.

In FIG. 5, the connector housing 11 is shown alone in a cross section perspective view, illustrating the detailed design of the housing 11. The housing illustrated in FIG. 5 is in some means different from the housings shown in the preceding drawings. At the right hand side of the housing 11, there is arranged a snap on edge 37 extending peripherally about the centre axis of the housing 11. The edge 37 is divided into sections along the periphery, and is arranged for fixing the connector to the wet-mateable connector part 17 reducing or eliminating the use of screws or other fasteners. This feature further reduces the number of required parts. This is especially advantageous due to economic reasons when the connector shell is made of exotic materials like titanium that normally requires fasteners made of the same expensive material.

Preferably, the connector housing 11 is made of an electrically insulating material, such as a hard and durable plastic material. Using dielectric material, a galvanic insulation is automatically achieved and the need for dielectric spacers 10a and dielectric washers 10b as illustrated in the prior art example of FIG. 1 is removed. This reduces complexity and cost.

As explained above, since the inner compartment 19 of the housing is filled with a liquid, the volume of the compartment 19 does not have to change significantly in order to increase the pressure of the contained liquid. Thus, the material can be quite stiff and the housing structure can be made robust, but still be flexible when connector is forced sideways thus reducing stress on connector and thus is reducing the risk for damaging the connector.

Referring again to FIG. 2, inside the inner compartment 19, a cable protector 39 is arranged. The cable protector 39 surrounds the flexible electrical conductors 21 which extend from the electrical conductors 17a of the receiving part 17 to the conductors 15a of the penetrator 15. Advantageously, the cable protector 39 has a cylindrical shape with different inner and outer diameter along its axial dimension, as illustrated in FIG. 2.

The cable protector 39 has four functions. Firstly it will protect the electrical conductors 21 in the inner compartment 19 from being squeezed inside a fold 29 of the housing 11, when the housing 11 is compressed by an external hydrostatic pressure.

Secondly it will occupy a significant part of the volume in the inner compartment 19. This reduces the amount of dielectric liquid (such as oil) that has to be inserted into the compartment 19. By making the cable protector 39 in a material that has a lower mechanical compressibility than the dielectric liquid, preferably a plastic, the use of the protector 39 results in that the housing 11 will be compressed less before the pressure is balanced. Less movement of the housing 11 walls will yield reduced mechanical stress in its material, thus making a simpler design of the housing 11 possible. Along with the lesser mechanical compressibility of the protector 39 compared to the oil in the inner compartment, the protector material will also advantageously have a lower thermal expansion coefficient than the oil. This is advantageous if the assembly is experiencing extreme temperatures, for instance if left in the sun onshore, whereby the heat can be significant in the housing material and in the inner compartment 19.

Thirdly, the cable protector 39 is arranged to hold the inner penetrator contact 15b onto the penetrator conductors 15a that face the inner compartment 19. To achieve this, the cable protector 39 is in contact with the housing 11 and exhibits an inner contact edge 39a abutting against said penetrator contact 15b. This is illustrated in FIG. 3. Advantageously, the cable protector 39 is made in two parts, so that it can be installed after the cables are connected to the wet-mateable connector 17 in their one end and to the penetrator 15 in their other end.

Fourthly, it increases the reliability of the housing 11. If a leakage occurs in the penetrator 15, and the oil in the inner compartment 19 penetrates into the low-pressure zone on the other side of the wall part 13 (i.e. into the left hand side of the wall part in FIG. 2), the housing 11 would be exposed to full subsea pressure only on the outside. Due to the relatively low strength of the bellows section this would lead to collapse and eventually let sea water into the housing 11, and thus causing failure. With the addition of the cable protector 39 designed to support the inside of the housing 11 from collapsing when exposed to full subsea pressure, the system will then become fault tolerant and be able to protect the connection from failure even with a leaking penetrator.

By having a positive oil pressure, i.e. higher pressure inside the oil filled housing 11 than outside the housing further fault tolerance can be achieved. If leaks should occur in housing 11, seals 25, 25a or inside connector 17, a positive oil pressure prevents conductive fluids entering inside of housing 11. Positive oil pressure in the housing 11 can be achieved by adding compressive forces large enough to overcome the bellow 29 stiffness. In FIG. 6 is shown a special version of housing 11 with integral polymer torsion springs 11a that is used to add such compressive force by tightening the spring attachment bolts 41, which are somewhat shorter than the stabilizing bolt 31. The design of the polymer torsion springs 11a together with location of spring attachment bolts 41 is such that the bending forces become neutralized.

Alternatively regular metal springs can be used to create and maintain a positive oil pressure.

The described design of the housing 11 is suitable for machining on a lathe, but to could also be made by other means, like milling or vacuum forming. Also injection molding would be a good way of producing the housing 11, increasing the number of possible designs. Then the flexible part could change form from a design meant to be machined in a lathe to different designs that may incorporate pressure compensating members with axial and/or radial movement, or is asymmetric design having only a small flexible wall part, the rest of the housing being stiff enough to remove the need for external metallic reinforcement. Also, the cable protectors can easily be included in a milled or molded design, further reducing the number of required parts.

The invention claimed is:

1. An electrical and/or optical connector housing with a wet-mateable connector receiving part adapted to receive a mating electrical and/or optical connector counterpart on an external surface of the connector housing when surrounded by a hydrostatic pressure, the connector housing including a compartment that is pressure balanced with respect to said hydrostatic pressure, wherein one or more electrical and/or optical conductors are guided from the receiving part to a penetrator, said penetrator forming a pressure barrier between said compartment and an opposite end of the penetrator, wherein the housing comprises at least one wall part adapted to be flexed by an exterior hydrostatic pressure exerting force on the housing, thereby changing the volume of said inner compartment, said at least one outer wall part including at least one fold extending substantially orthogonal to a linear direction and the housing is adapted to be compressible in the linear direction, and whereby said outer wall part forms at least a part of the encapsulation of said compartment and the outer wall part is exposed to the hydrostatic pressure.

2. The connector housing according to claim 1, wherein that said at least one fold extends circumferentially about said compartment.

3. The connector housing according to claim 1 wherein the housing is arranged with a support structure for maintaining the substantial orientation of the receiving part, the interface between said support structure and housing allowing said wall part to flex.

4. The connector housing according to claim 3, wherein the support structure is a cylinder in which the housing is arranged.

5. The connector housing according to claim 3, wherein the support structure comprises a support bolt along which axis a part of the housing can slide, the support bolt having a sliding interface with the housing.

6. The connector housing according to claim 1 wherein said walls are manufactured of an electrically non-conducting material.

7. The connector housing according to claim 1 wherein said inner compartment is filled with a dielectric liquid, and that said wall part is biased by a biasing device to provide an overpressure in the compartment.

8. The connector housing according to claim 7, wherein the biasing device comprises a torsion spring extending from the housing, whereby the torsion spring exerts a biasing force onto the housing.

9. The connector housing according to claim 1 further comprising comprises a cable protector in the compartment through which said electrical and/or optical conductors extend.

10. The connector housing according to claim 9, wherein the cable protector includes an outer surface proximate to an inner wall surface of the housing.

11. The connector housing according to claim 9, wherein the cable protector includes an inner contact edge arranged to maintain a penetrator contact connected to the penetrator conductors and adapted to abut against said penetrator contact.

12. An electrical or optical connector comprising:
a housing having an outer wall configured to be exposed to a liquid and a hydrostatic pressure;
a wet-mateable connector receiver at one end of the housing and configured to receive a mating electrical and/or optical connector, wherein the connector receiver is configured to be exposed to the liquid and the hydrostatic pressure;
a displaceable wall included in the outer wall of the housing, wherein said displaceable wall has an outer surface configured to be exposed to the liquid and hydrostatic pressure, said displaceable wall includes at least one fold extending substantially orthogonal to a linear movement direction of the housing wherein said at least one fold allows for displacement of the displaceable wall;
a compartment in the housing wherein the displaceable wall is configured to separate the compartment from the liquid, wherein the hydrostatic pressure displaces the displaceable wall and thereby balances a pressure in the compartment with the hydrostatic pressure;
a pressure barrier at a second end of the housing and forming an end of the compartment, wherein the pressure barrier includes a penetrator providing a conductive coupling extending from the compartment and through the pressure barrier,
a conductive coupling extending through the compartment and connecting the connector receiver to the penetrator, and a guide shaft extending between the wet-mateable connector and pressure barrier wherein the wet-mateable connector is slidably mounted to the guide shaft to allow the displacement of the displaceable wall.

13. The electrical or optical connector of claim 12 wherein the guide shaft is external to the housing.

14. The electrical and/or optical connector housing of claim 1 wherein the at least one fold deforms when the housing is compressed by the hydrostatic pressure.

15. The electrical and/or optical connector housing of claim 1 wherein the at least one fold bends when the housing is compressed by the hydrostatic pressure.

* * * * *